(12) United States Patent
Willford et al.

(10) Patent No.: US 12,583,603 B2
(45) Date of Patent: Mar. 24, 2026

(54) AUTOTHROTTLE SYSTEM FOR AIRCRAFT

(71) Applicant: Textron Aviation Inc., Wichita, KS (US)

(72) Inventors: Alec Charles Willford, Wichita, KS (US); Ronald J. Parker, Wichita, KS (US); Michael R. DePinto, Wichita, KS (US)

(73) Assignee: Textron Innovations Inc., Providence, RI (US)

( * ) Notice: Subject to any disclaimer, the term of this patent is extended or adjusted under 35 U.S.C. 154(b) by 147 days.

(21) Appl. No.: 17/934,706

(22) Filed: Sep. 23, 2022

(65) Prior Publication Data

US 2023/0110798 A1 Apr. 13, 2023

Related U.S. Application Data

(60) Provisional application No. 63/248,149, filed on Sep. 24, 2021.

(51) Int. Cl.
B64D 31/04 (2006.01)
B64C 13/22 (2006.01)
B64D 31/06 (2024.01)

(52) U.S. Cl.
CPC .............. B64D 31/04 (2013.01); B64C 13/22 (2013.01); B64D 31/06 (2013.01)

(58) Field of Classification Search
CPC ........ B64D 31/08; B64D 31/06; B64C 13/30; B64C 13/22
See application file for complete search history.

(56) References Cited

U.S. PATENT DOCUMENTS

| | | | |
|---|---|---|---|
| 4,651,954 A | 3/1987 | Miller | |
| 4,805,396 A * | 2/1989 | Veerhusen | F02C 9/42 |
| | | | 60/39.15 |
| 5,188,316 A | 2/1993 | Dressler et al. | |
| 5,456,428 A * | 10/1995 | Hegg | B64C 13/12 |
| | | | 244/229 |
| 10,099,795 B2 | 10/2018 | Hedrick | |
| 10,604,268 B2 | 3/2020 | Lisio et al. | |
| 2013/0256462 A1* | 10/2013 | Antraygue | G05G 9/047 |
| | | | 244/221 |
| 2014/0091181 A1* | 4/2014 | Ouellette | G06F 3/0338 |
| | | | 244/221 |
| 2020/0148379 A1* | 5/2020 | Antraygue | B64D 31/06 |
| 2020/0182183 A1* | 6/2020 | Hunter | B64D 31/04 |
| 2020/0317326 A1* | 10/2020 | Sheffer | B64C 13/22 |

* cited by examiner

*Primary Examiner* — Ashesh Dangol
(74) *Attorney, Agent, or Firm* — Avek IP, LLC

(57) ABSTRACT

Disclosed is an automatic throttle arrangement utilizing a servo which receives commands from a controller on an aircraft and responsively rotates a mechanical device that is linked by a cable arrangement with the aircraft's throttle lever enabling automated throttle control. The mechanical device can be fixed to the throttle lever assembly using rivets designed to fail in case the servo/cable arrangement jams. This leaves the lever able to continue manual function.

21 Claims, 13 Drawing Sheets

AUTOTHROTTLE SYSTEM FOR AIRCRAFT

CROSS-REFERENCE TO RELATED APPLICATIONS

This application claims the benefit of U.S. Provisional Patent Application No. 63/248,149 filed Sep. 24, 2021, the entire contents of which are herein incorporated by reference.

BACKGROUND OF THE INVENTION

1. Field

The disclosed embodiments relate generally to the field aircraft power systems. More specifically, the embodiments relate to automatic throttle mechanical systems and related methods.

2. Description of the Related Art

Many throttle arrangements have been used in aircraft. Some throttles operate by converting mechanical activation from the throttle lever into digital information that is received by a controller, which takes the digital information received and in turn, changes an aircraft parameter (e.g., engine speed), in response.

Some prior art throttle system arrangements, e.g., ones used in a typical two-engine jet-propelled aircraft having engines on both sides of the aircraft, include two sticks that are next to one another so that they can be easily moved together. But the two sticks are also independent so that each can be moved to different settings. Each stick is configured to operate one of the two turbine engines. The rotation of each stick is mechanically translated into pairs of Rotary Variable Differential Transformers (RVDTs). RVDTs, as is known in the art, take mechanical rotation, and based on angular displacement, transmit signals so that the extent of displacement can be used by digitally-based electronic systems existing in the aircraft, e.g., a Full Authority Digital Engine Control (FADEC) system. A FADEC includes a computer and operates as an engine control unit. Normally the FADEC controls most or all performance aspects for the turbine engines.

Another two-lever arrangement is used to drive a turboprop engine, where a single turbine engine drives an aircraft propeller. One lever controls the pitch of the turboprop, and a second lever controls the turbine speed. Together, the pilot is able to control thrust output by independently moving the levers. However, the pitch of the propeller and the speed of the turbine are controlled by two separate mechanical systems.

Another system, disclosed in U.S. Patent Application Publication No. 2020/0182183 made by Hunter et al. discloses a throttle quadrant arrangement for a turboprop that uses a single lever along with RVDTs to control propeller pitch and speed using the FADEC.

SUMMARY

In some aspects, the techniques described herein relate to a throttle system for an aircraft, the throttle system including: a servo configured to rotate a servo output mechanism in response to autopilot commands received from a controller; a throttle lever configured to rotate around a hub; a mechanical connection made between the servo output mechanism and the throttle lever, the mechanical connection being configured to move in response to a rotation of the servo output mechanism in an autopilot mode during normal operation; and a breakable link included in the mechanical connection, the breakable link being breakable upon a force applied to the throttle lever in a failure mode where the servo output mechanism is disconnected from the throttle lever such that the throttle lever can move freely relative to the servo output mechanism due to the mechanical connection being broken.

In some aspects, the techniques described herein relate to a throttle system wherein the mechanical connection is a remote connection.

In some aspects, the techniques described herein relate to a throttle system wherein the remote connection is established using a cable.

In some aspects, the techniques described herein relate to a system wherein the cable is secured around both the servo output mechanism and an irregularly-shaped disk which rotates with the throttle lever around the hub.

In some aspects, the techniques described herein relate to a system wherein the cable is secured into grooved rim on opposed sections established around the irregularly-shaped disk.

In some aspects, the techniques described herein relate to a system wherein the servo output mechanism is a capstan.

In some aspects, the techniques described herein relate to a system wherein the throttle lever is a single lever configured to control propeller speed.

In some aspects, the techniques described herein relate to a system wherein the throttle lever is configured to control propeller pitch.

In some aspects, the techniques described herein relate to a system wherein the controller is a Full Authority Digital Engine Control (FADEC) system.

In some aspects, the techniques described herein relate to a system wherein the throttle lever is mechanically linked to one or more Rotary Variable Differential Transformers (RVDTs), the system configured to impart angular displacement of the throttle lever into the one or more RVDTs, and the one or more RVDTs being configured to presenting electronic signals representing throttle-lever position to the controller.

In some aspects, the techniques described herein relate to a system wherein the mechanical connection includes a following disk which is fixed to and rotates about the hub along with the throttle lever, the following disk being configured to receive rotation imparted by the servo output mechanism.

In some aspects, the techniques described herein relate to a system wherein the follower disk rotates in spaced-apart parallel plane on the hub relative to the throttle lever.

In some aspects, the techniques described herein relate to a system wherein the follower disk is connected to and outer sector having two opposing fanned out areas, each fanned out area including a grooved outer rim, each grooved outer rim securing an end of a cable received and driven by the servo output mechanism.

In some aspects, the techniques described herein relate to a system wherein the follower disk has one or more notched-out areas which are defined into a thickness on one side of the follower disk directly opposite a location at which each of two attachment portions exist, the notched out areas each receiving a fastener and allowing for protruding fastener components to avoid interference with rotation.

In some aspects, the techniques described herein relate to a system wherein the breakable link includes at least one connecting device constructed to fail upon the throttle lever receiving a force in excess of a threshold of an amount of force greater than is normally required to move the throttle lever and less than an amount of force which would cause damage to the system.

In some aspects, the techniques described herein relate to a system wherein the breakable link is a connecting mechanism that is configured to be subjected to a shearing force upon an occurrence of a dysfunction in a component in the mechanical connection made between the servo output mechanism and the throttle lever, the shearing force breaking the breakable link.

In some aspects, the techniques described herein relate to a system wherein the breakable link includes one or more rivets configured to maintain the mechanical connection during normal operation, the rivets being further configured to break by shearing upon a jamming of one of the servo or a component of the mechanical connection.

In some aspects, the techniques described herein relate to an aircraft system including: a controller configured to operate a servo to create angular movement of a control lever; a mechanical connection made between the servo and the control lever, the mechanical connection including a follower member which rotates with the control lever and on a common axis with the control lever, the follower member receiving rotation from the servo and consequentially imparting rotation into the control lever; and a breakable member included in the mechanical connection, the breakable member being caused to shear off upon a mechanical jamming of either the servo or a component of the mechanical connection such that the control lever continues operation manually.

In some aspects, the techniques described herein relate to a system wherein: the follower member rotates in spaced-apart parallel plane on a hub relative to the throttle stick; and a sector rotates in an additional parallel plane outside of the follower member, the sector including a grooved outer rim, the grooved outer rim securing two ends of a cable that is driven by servo.

In some aspects, the techniques described herein relate to a system wherein the cable is configured to run around a double-grooved pulley, a first groove on the double-grooved pulley receiving a first portion of the cable running from an upper portion of the sector, and a second groove on the double-grooved pulley receiving a second portion of the cable running from a lower portion of the sector, the double-grooved pulley configured to cause the cable to avoid an existing aircraft structure without compromising functionality of the servo in rotating the sector.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages will be apparent from the following detailed description of the embodiments and the accompanying drawing figures.

BRIEF DESCRIPTION OF THE SEVERAL VIEWS OF THE DRAWINGS

Illustrative embodiments are described in detail below with reference to the attached drawing figures, which are incorporated by reference herein and wherein.

Figure 1:
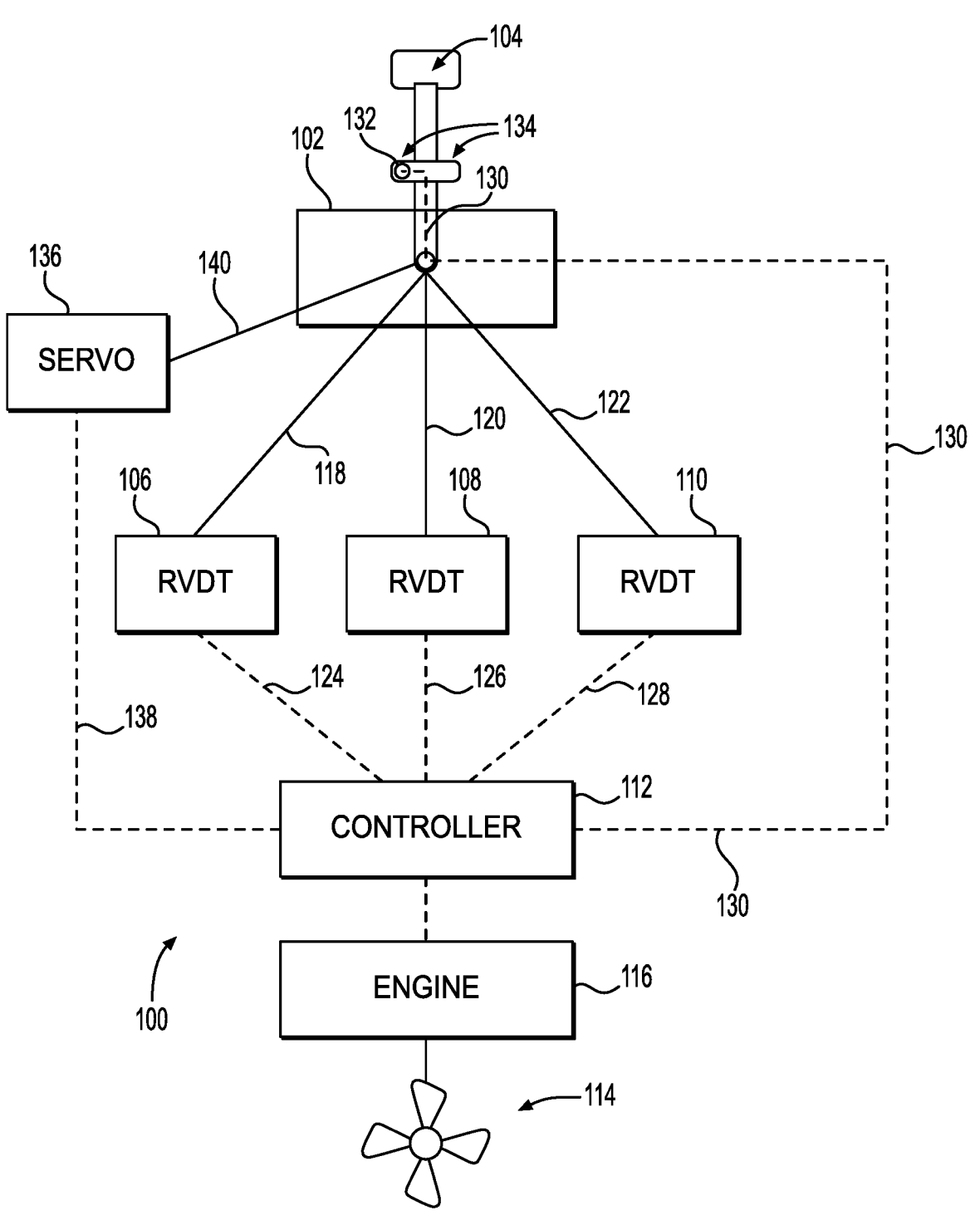
FIG. 1 shows a system diagram for an embodiment of an automatic throttle system.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized, and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the technology can include a variety of combinations and/or integrations of the embodiments described herein.

Embodiments provide systems and a method for providing autopilot for a single stick throttle, e.g., like the one disclosed in U.S. Patent Application Publication No. 2020/0182183 made by Hunter et al., the entire contents of which are herein incorporated by reference.

The systems and methods of operation disclosed herein, in embodiments, enable the use of a single throttle lever with a controller to operate more than one thrust related function on an aircraft. The controller could be an automated engine control system, e.g., a FADEC system. Additionally, the systems and methods enable the operation of a turboprop with only a single lever.

The single lever throttle quadrant feeds information about throttle lever commands to the controller (e.g., FADEC system). Three mechanical-rotation to electronic-conversion devices, e.g., RVDT's are used to verify the single-lever position, and feed that information to the FADEC. The FADEC determines the correct fuel flow and power levels for the turbine engine, as well as pitch control for the propeller.

FIG. 1 shows a system diagram for an embodiment for a system 100. System embodiment 100 uses a single throttle lever control block 102, in embodiments, for a turboprop aircraft. As can be seen, the control block 102 includes a single lever 104 which will be the sole user interface required for controlling engine speed, propeller pitch, and thus, thrust. Mechanical input is received from lever 104 independently into a first, a second, and a third RVDT, 106, 108, and 110 respectively. Electronic signals from RVDTs 106, 108, and 110 are fed into a single controller 112. The controller 112, in embodiments, can be a FADEC system. Controller 112 has been configured to accommodate both controls relating to the pitch of an aircraft propeller 114, as well as fuel intake and other control information necessary to operate a gas turbine 116.

It should be noted that the technologies discussed herein could be incorporated into systems involving the control of an automatically controlled piston-engine aircraft (with or without the incorporation of a FADEC). Further, the system could be implemented on engine-driven aircraft where pitch-control is not executed. Thus, the disclosures herein should not be limited only to implementations into turboprops unless otherwise stated in the claims.

The mechanical connections between the single lever 104 and each of the RVDTs are completely independent from one another in terms of operation. For example, (i) a mechanical connection 118 between lever 104 and RVDT 106; (ii) a connection 120 between lever 104 and RVDT 108; and (iii) a connection 122 between lever 104 and RVDT 110; ensures that the other two RVDTs continue to operate as intended even if one of the other systems is jammed or otherwise fails.

The electronic connections (e.g., a signal pathway 124 from RVDT 106; a signal pathway 126 from RVDT 108, and a signal pathway 128 from RVDT 110) are also independent from one another into the controller 112. This means that if one RVDT is lost, signals from the other two will still be received.

The system also includes a communications connection 130 (e.g., an electronic connection) made between an automatic throttle on/off button 132 existing on an outcropped portion 134 on the lever 104 and the controller 112 (e.g., FADEC in embodiments). An automatic throttle arrangement, as will be known to those skilled in the art, is used in commercial large aircraft to establish constant aircraft speed. Referring back to the schematic of FIG. 1, activation of the automatic throttle on/off button 132 to an "on" selection will cause the system to move to an automatic state. The controller 112 is configured recognize the electronic "on" signal transmitted by the button 132 (via line of communications 130) and put the system in an "on" state wherein the controller 112 will maintain the desired speed of the aircraft without pilot inputs via lever 104 being necessary. Controller 112 does this by sending command signals via a line of communications 138 to a servomechanism, or "servo" 136 which is mechanically connected to and causes the lever 104 to automatically move (via mechanical connection 140) per communications received from the controller 112, and thus control engine speed and in some turboprop embodiments, simultaneously control propeller pitch (e.g., of propeller 114). The term "servo" as used in this application should be construed for any arrangement that allows for motor controlling one thing to operate another.

Figure 2A:
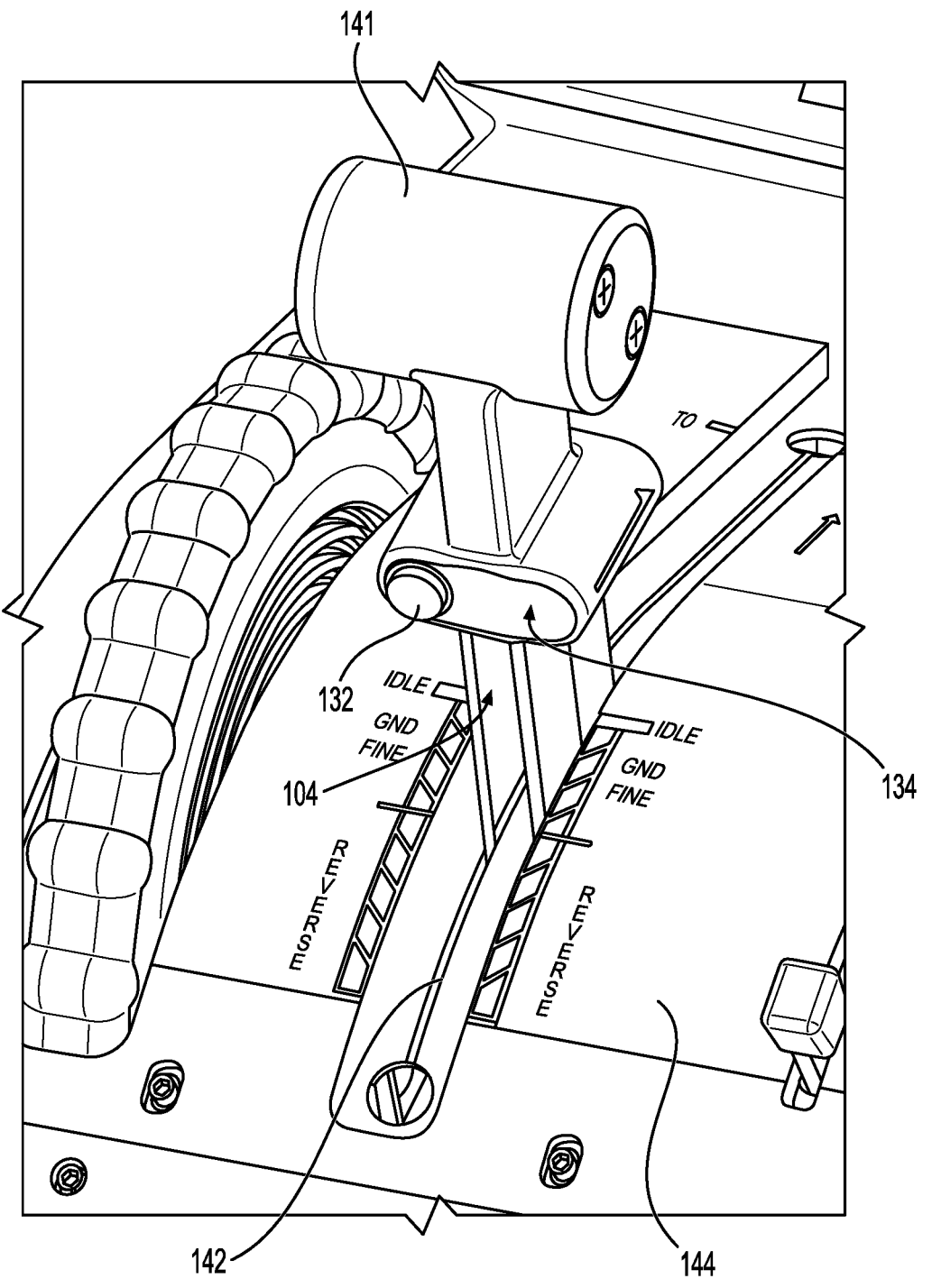
FIG. 2A shows a cockpit environ in which the throttle arrangement might exist in some embodiments.
Figure 2B:
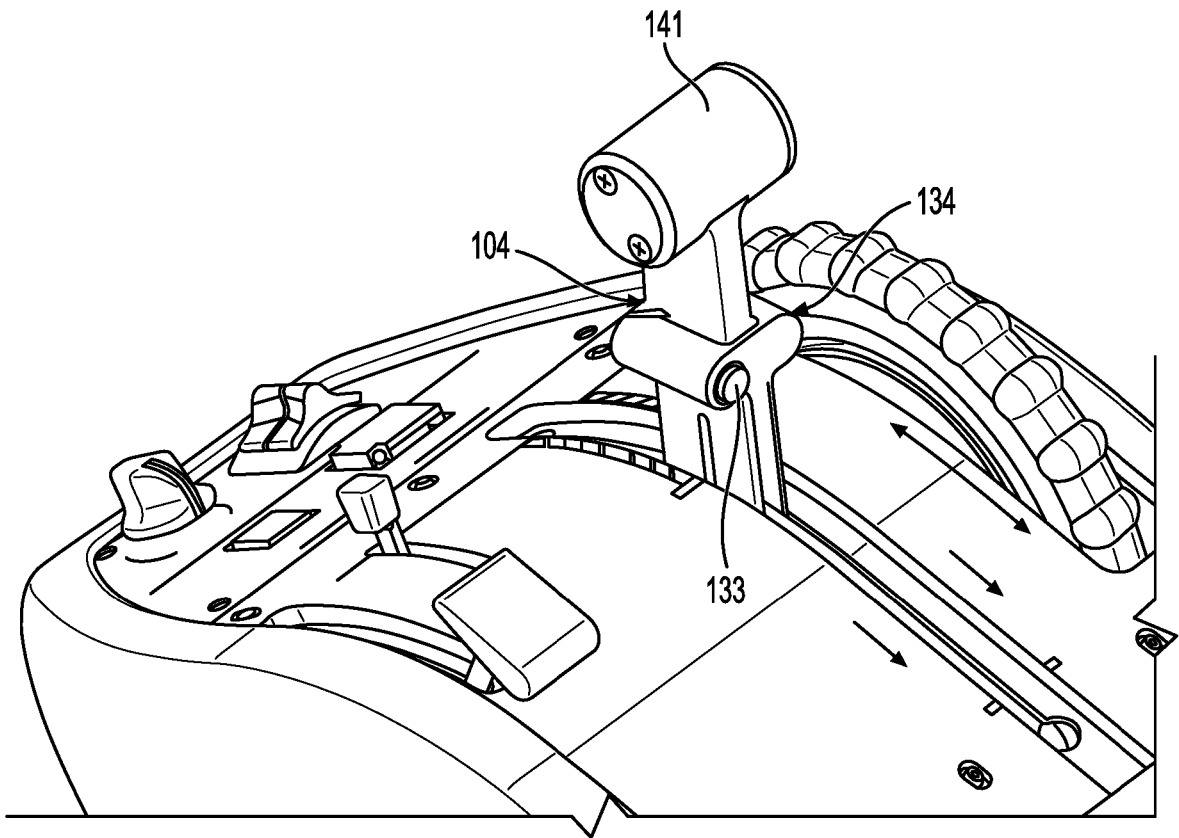
FIG. 2B shows a rear perspective view of the throttle arrangement of FIG. 2A.

FIGS. 2A and 2B show how the throttle arrangement appears, in an embodiment, as part of an aircraft interior arrangement wherein the lever 104 operates within a slot 142 made into a control panel cover plate 144. The lever 104 can be relocated by a pilot pushing down on an upper handle 141 to overcome the internal friction of the quadrant, moving the lever to a new position, and then letting go of lever, leaving the lever in place. Upon the release of pressure, the internal friction from the quadrant will overcome vibration or other effects so that the lever remains where it was left. Thus, the lever 104 can thus be manually moved to various angular locations (forward or rearward) to create different engine speeds. The outcropped wings 134 and the auto-throttle engage button 132 thereon can also be seen in FIG. 2A. As will be discussed, depressing button 132 enables the pilot to go into auto-throttle mode. Pushing an auto-throttle disengage button 133 located on the rear of the outcropped wings (see rear view FIG. 2B) causes the system to be brought out of auto-throttle mode and back to manual. In auto-throttle mode, the engine controller 112, e.g., FADEC, automatically moves the lever 104 forward and rearward thus implementing a speed setting.

During normal operation, if, at any point, the pilot wishes to manually operate the stick, he or she can physically direct the stick in a manner inconsistent with the automatic operation in progress even without depressing the autopilot button 133. These manual inputs will overcome the automated commands and turn off the autopilot. Upon the development of a mechanical jam, however, (detected by observation or the receipt of warnings from aircraft systems), the pilot might encounter a situation where this override cannot occur. In such a case, a system and processes are presented where an intentional mechanical failure is introduced between the throttle lever and the mechanical output of the servo used by the autopilot system to control the stick. In one embodiment, frangible rivets allow the pilot to mechanically shear the mechanical connection so that the stick may be moved even though the mechanical linkages have become jammed, or if the servo is in a "runaway" failure case where the servo rotates to one of the two maximum angular positions (e.g., limiting stops) and will not return.

Figure 3A:
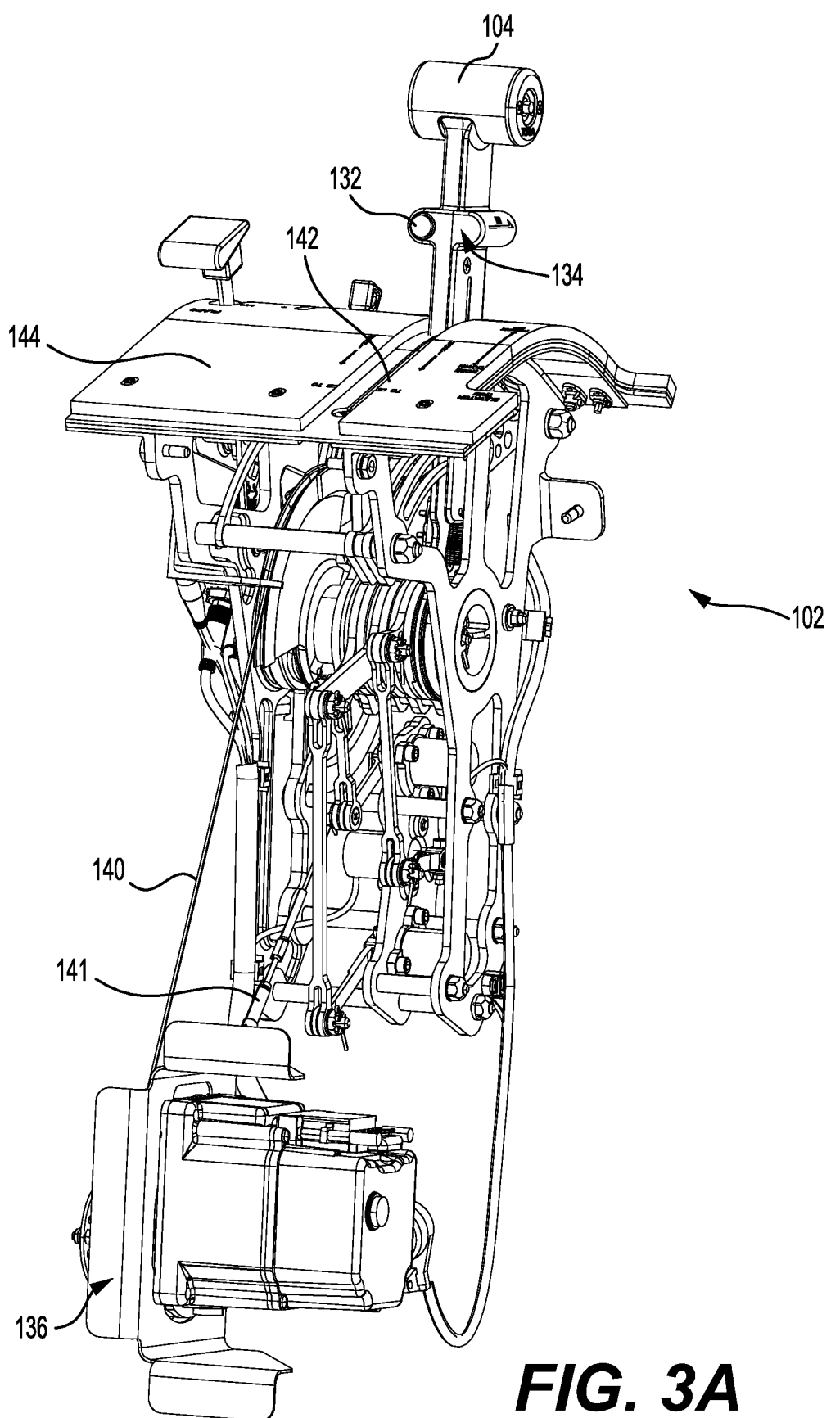
FIG. 3A shows a perspective view from a right-hand side angle of the FIG. 2A embodiment where the throttle is removed from the installation to reveal internal structures.
Figure 3B:
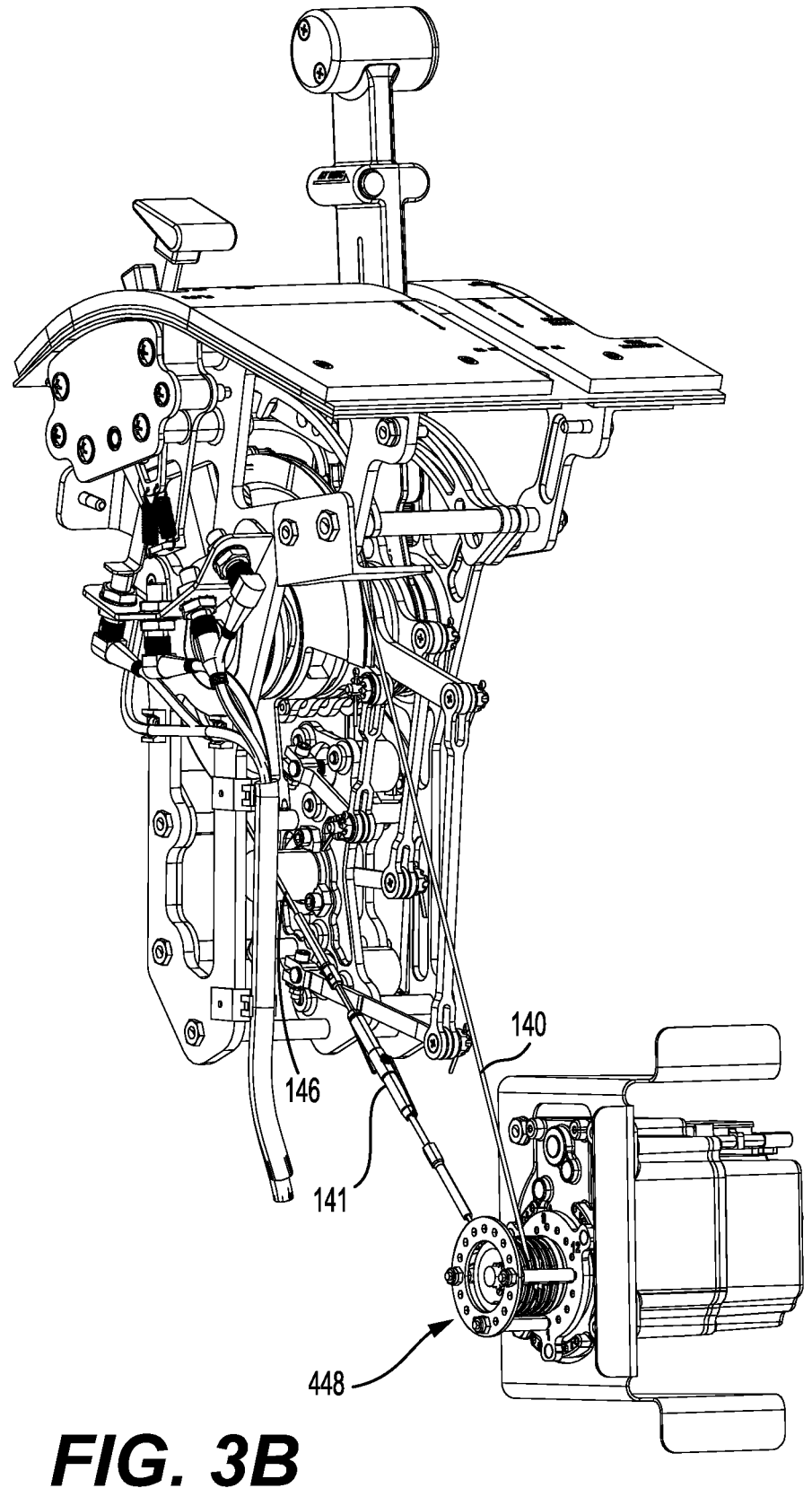
FIG. 3B shows a perspective from a left-hand side angle of the throttle removed from installation.
Figure 4A:
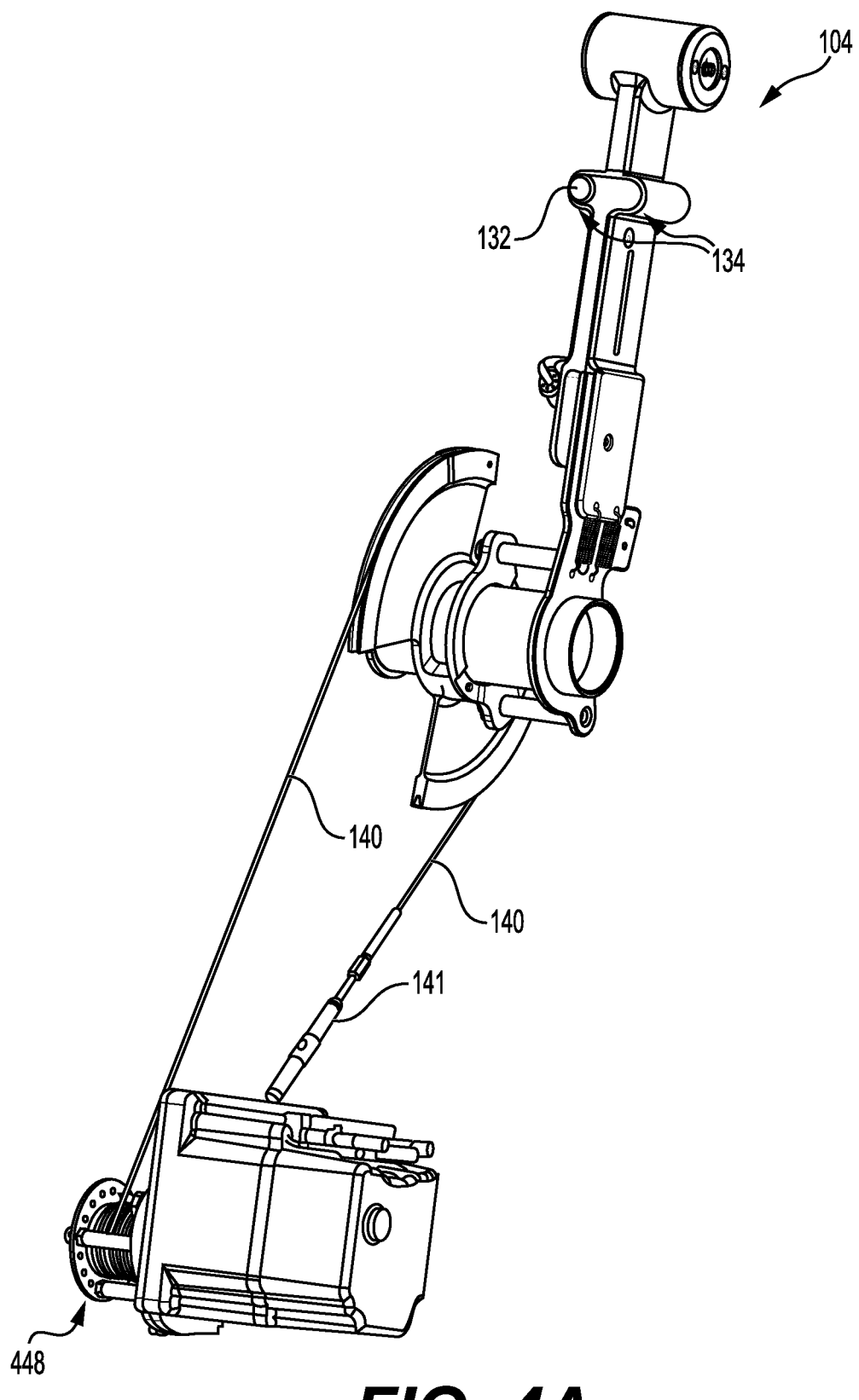
FIG. 4A shows a perspective taken from a right-hand side angle with components removed to reveal the mechanical systems associated with the autothrottle system.
Figure 4B:
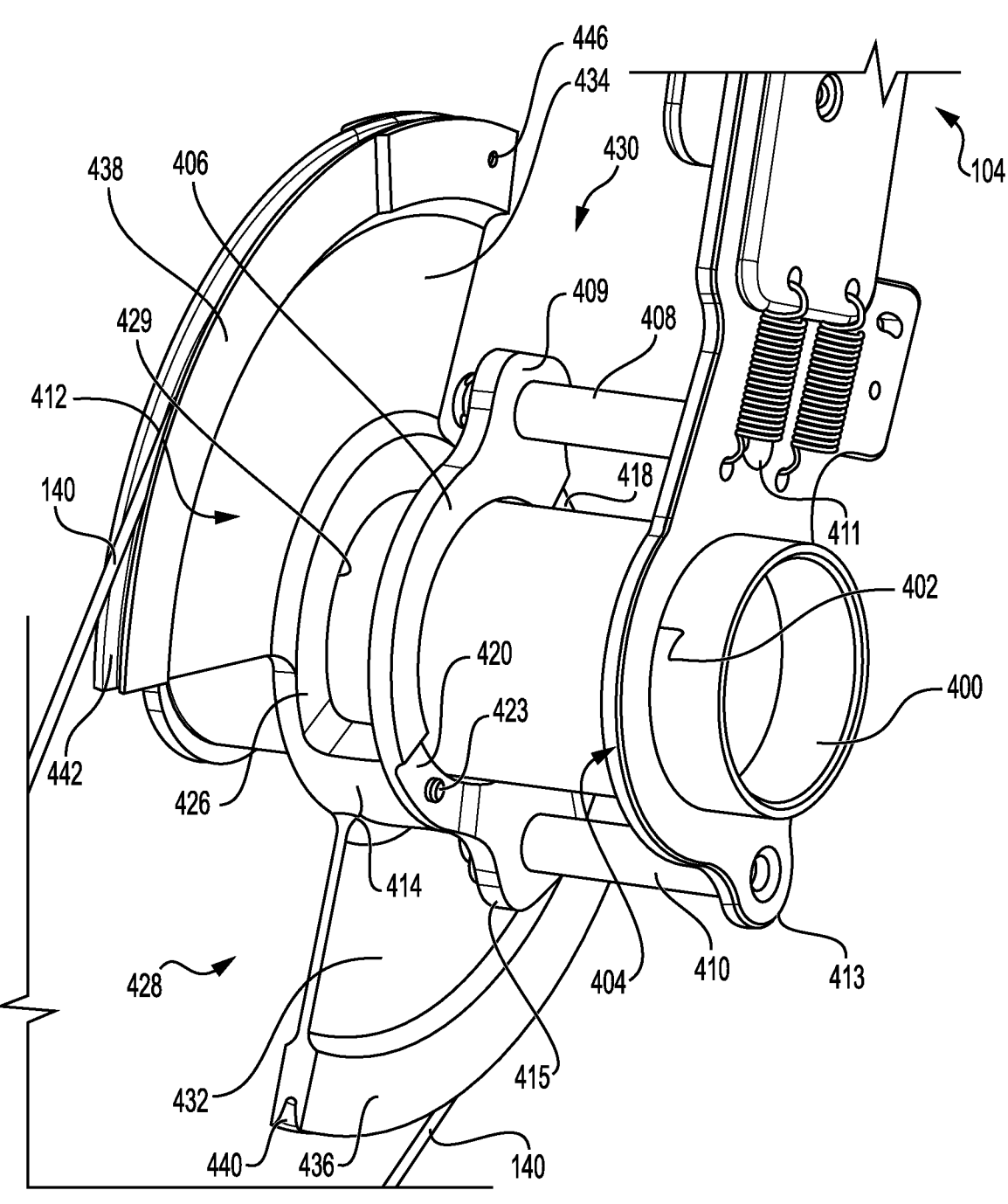
FIG. 4B is an enlarged view of the hub area of what is illustrated in FIG. 4A.
Figure 4C:
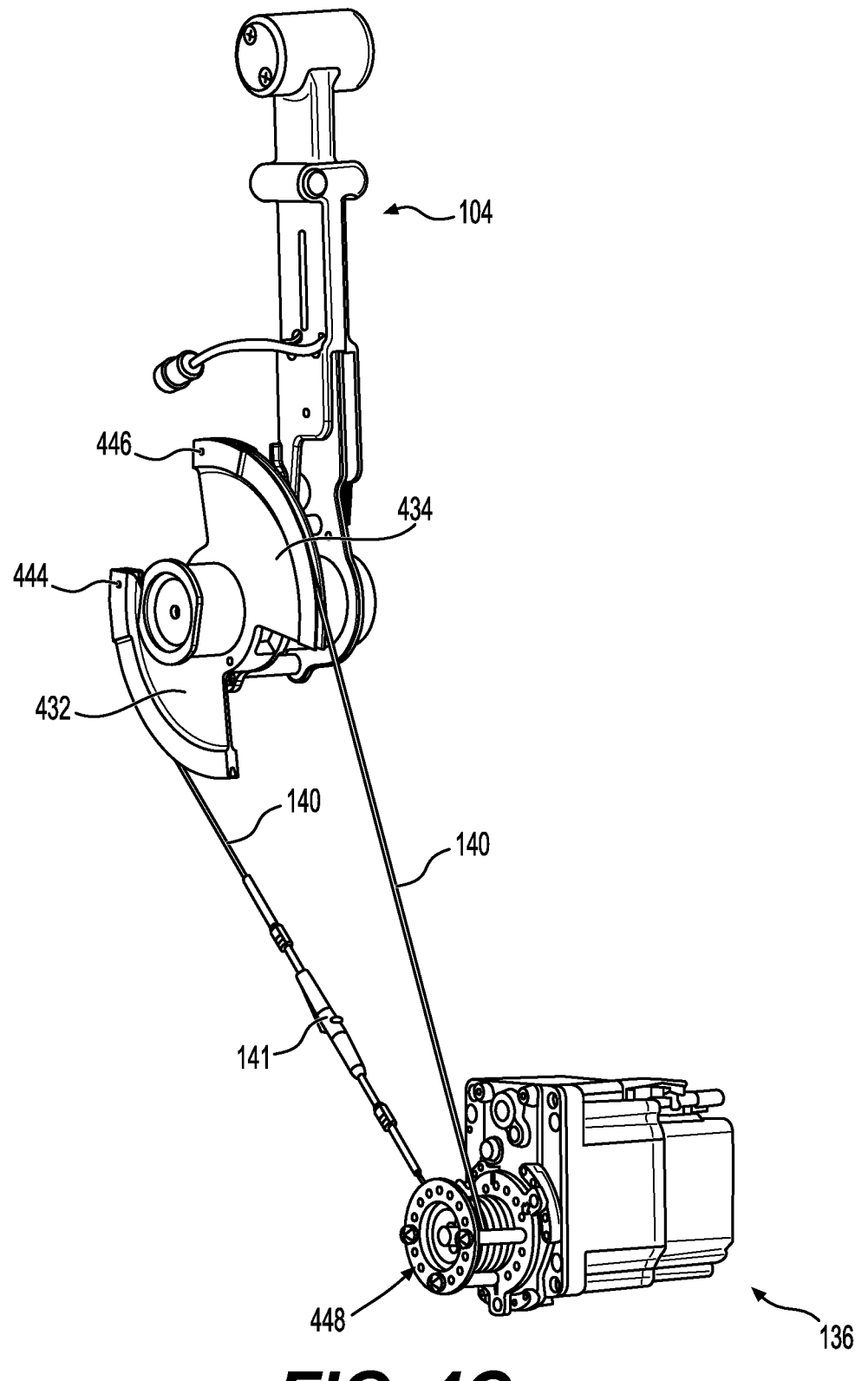
FIG. 4C shows a perspective taken from a left-hand side angle with components removed to reveal the mechanical systems associated with the autothrottle system.

FIGS. 3A and 3B show the throttle arrangement removed from the control panel so that the internals can be seen. FIGS. 4A and 4B reveal only the features relevant to the servo-controlled automatic throttle arrangement (the rest of the features have been removed for better unobstructed viewing). Referring first to FIG. 3A, the servo 136 is mounted in a location relatively proximate the throttle block 102 and is mechanically connected by a cable 140. FIGS. 3B and 4B better show the details regarding cable 140 and how it is spooled onto the servo 136. The term "cable" as used in this application should be construed as allowing for any elongated device constructed of flexible material and useful for connecting two things, the definition including, e.g., cords, lines, rope, belts, chains or other like devices. In the disclosed embodiments, the cable is constructed of flexible metal.

The structural details of the lower lever assembly are shown in FIG. 4B. As can be seen, the mechanical equipment is centered around a stationary hub 400 which is fixed to nonmoving aircraft structure. Hub 400 is received through a hole 402 made through a lower disk portion 404 of the lever 104. A following disk 406 is fixed to and rotates with lower disk portion 404. Following disk 406 rotates about hub 400 along with the lower disk portion 404 because the two are (i) connected by a first upper bolt 408 which is fixed between an upper ear 409 of the following disk 406 and a connection 411 made into the lower disk portion 404; and (ii) a second lower bolt 410 which is fixed between a lower ear 415 of the following disk 406 and a lower ear 413 created on the lower disk portion 404. Disk portion 404 and follower disk 406 rotate in spaced-apart parallel planes on the hub 400.

Figure 4D:
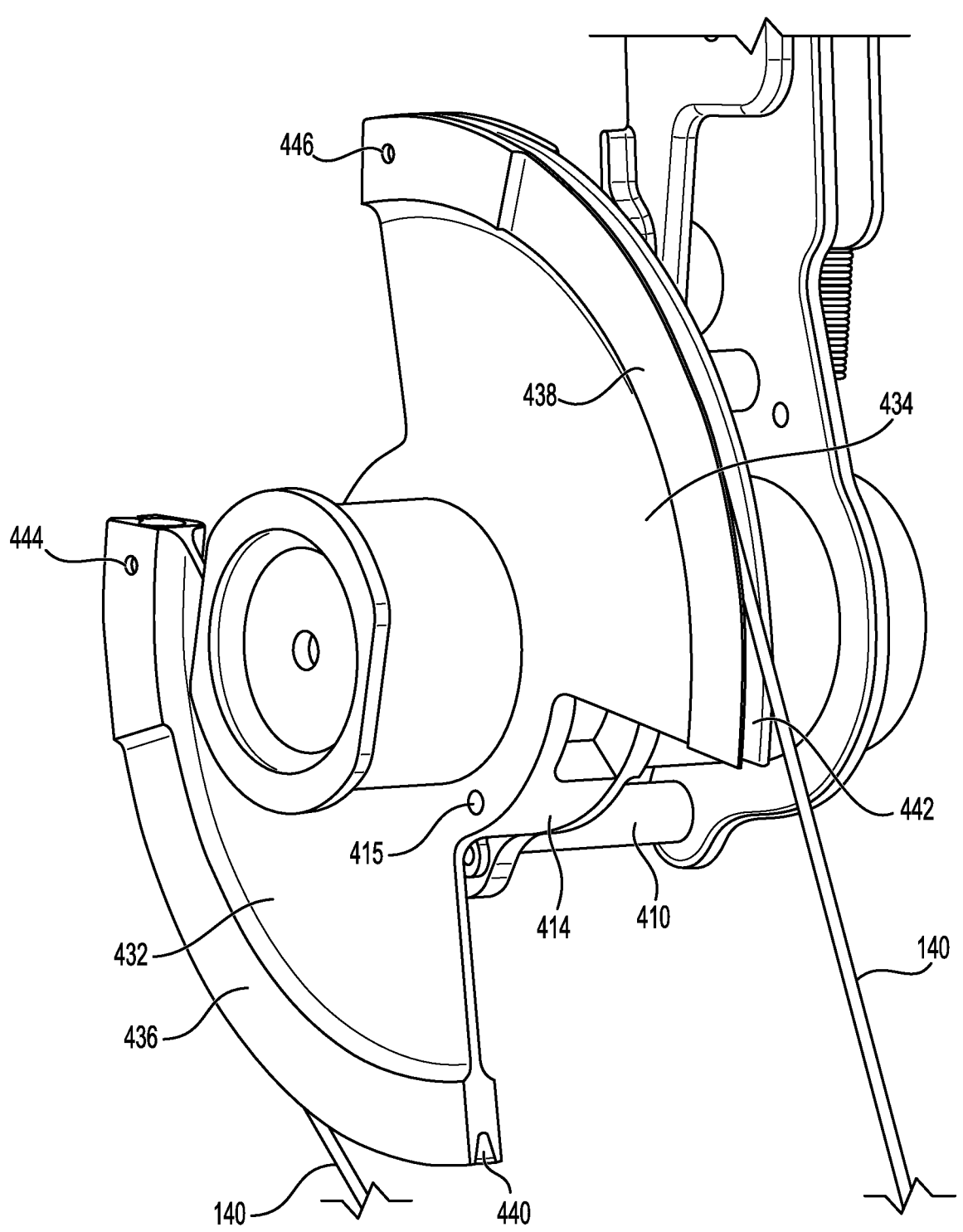
FIG. 4D is an enlarged view of the hub area shown in FIG. 4C.
Figure 4E:
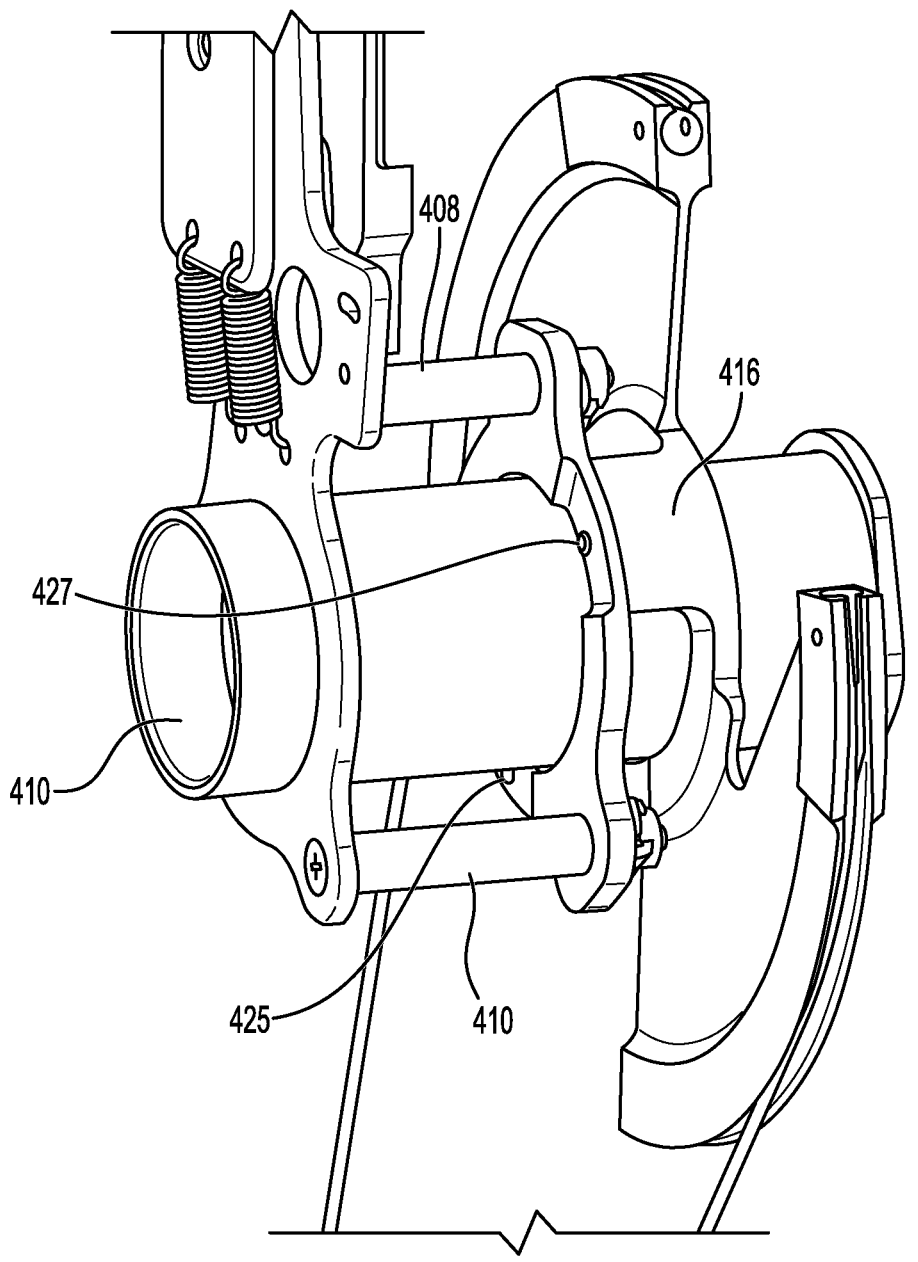
FIG. 4E is a rear view of the hub area shown in FIG. 4D.
Figure 4F:
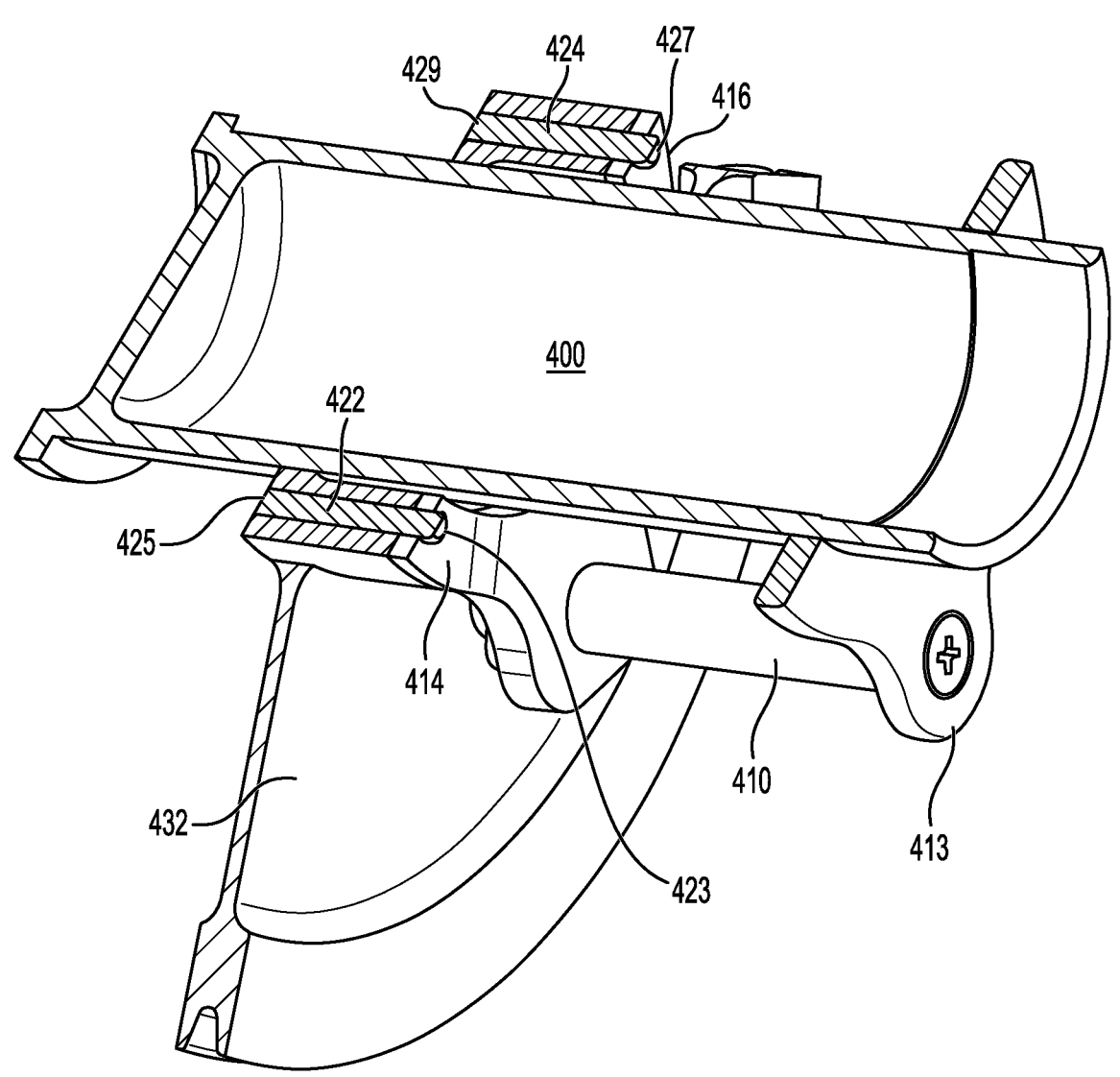
FIG. 4F shows a section taken down the center axis of the hub revealing rivets used to prevent jamming the throttle.

A sector 412 is also in parallel with the lower disk portion 404 and the follower disk 406 and is a fixed relationship so that it ordinarily rotates with them about the hub 400. This is made possible by opposed linking portions 414 (FIG. 4D) and 416 (FIG. 4E) which connect and space apart the sector 412 and the follower disk 406. Notched-out areas 418 and 420 are defined into the thickness on one side of the follower disk 406 directly opposite the location at which each linking portion (each of linking portions 414 and 416) is attached. Referring to FIG. 4F, rivets 422 and 424 are installed through and along the linking portions 414 and 416, respectively. First rivet 422 has a butt portion 423 and a head portion 425. Similarly, second rivet 424 had a butt portion 427 and a head portion 429. Butt portions 423 and 427 can be seen in FIGS. 4B and 4E, respectively. Notched out areas 418 and 420 allow for the butt portions 425 and 427 of each of rivets 422 and 424 (respectively) not to interfere with other disks (removed in the FIG. 4 images) that exist between the lower disk portion 404 and the follower disk 406.

Each of the rivets are designed to fail (e.g., shear) if either of the sector 412 or the servo 136 (attached by cable 140) were to become unable to move freely or work properly, e.g., a jam. More specifically, the existence of a jam occurring in the sector or servo systems will, upon the pilot applying greater than usual force to the stick, cause back shear pressure against the rivets. The shearing of the rivet pairs 422 and 424 upon a jam enables the lever 104 to be freed up to rotate about the stationary hub 400, thus allowing the rest of the throttle quadrant to continue to operate in transmitting readings to the RVDTs, etc. When this occurs, the jammed sector 412 will remain stationary, but the follower disk 406 and lower portion 404 of the lever will remain free to rotate with the stick. Thus, if the pilot detects immovability of the stick 104 due to a jam in the combined servo 136/cable 140/sector 412 arrangement, he or she can apply the necessary force required to shear the rivet pairs 422 and 424, and the stick will be free to operate in manual mode.

Returning to FIG. 4B, sector 412, in the disclosed embodiment, includes a completely circular innermost radial portion 426 from which the linking portions 414 and 416 extend out. The completely circular portion 426 also surrounds a hole 429 that receives the hub 400. The sector is not a perfectly circular disk in that it includes two symmetrical removed areas 428 and 430 leaving two opposing fan-shaped portions 432 and 434 of the sector 142. The outer peripheral edges 436 and 438 of each of the fan shaped portions 432 and 434, respectively, include grooves 440 and

Figure 5A:
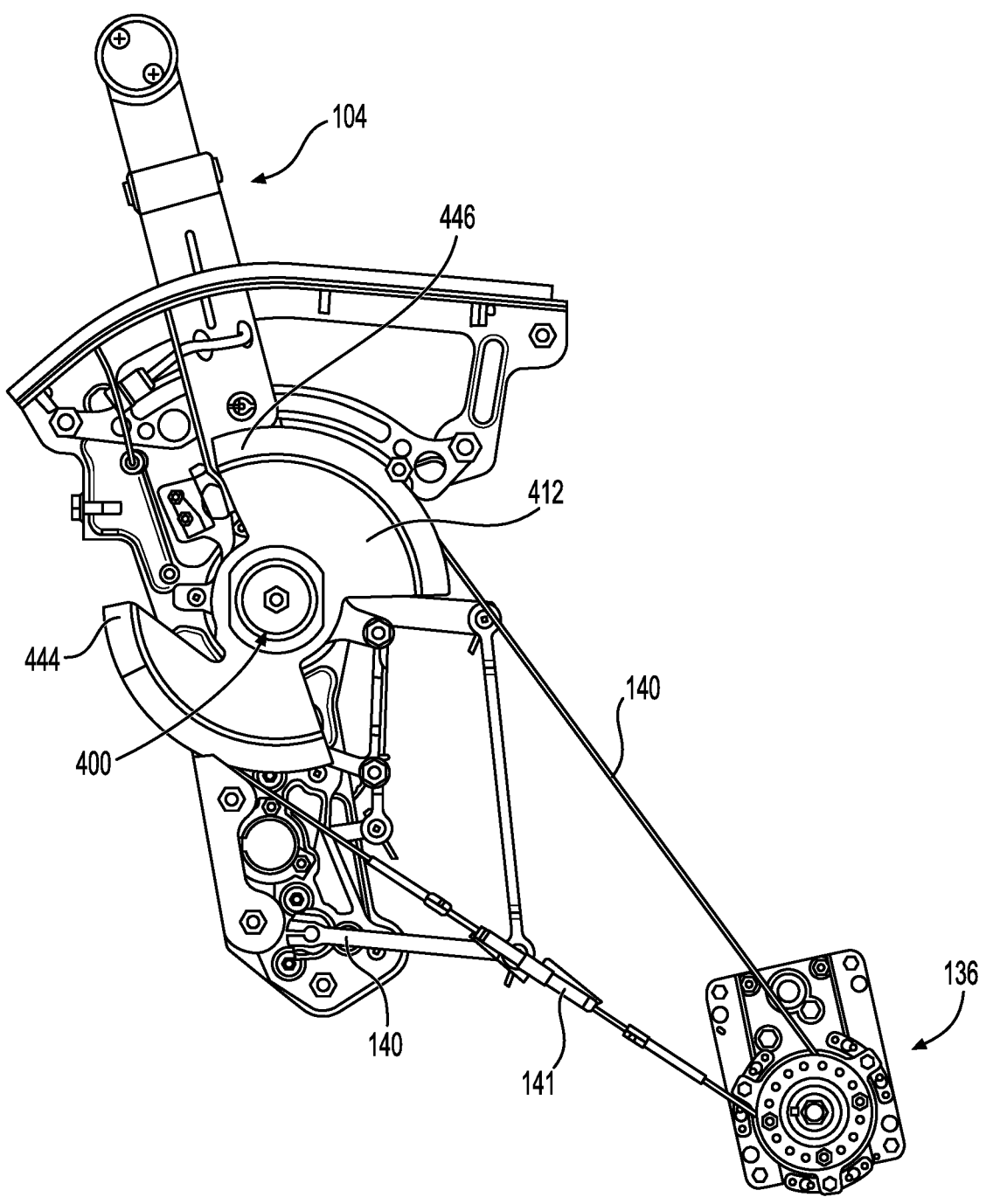
FIG. 5A is a left-hand side view of the throttle system as shown in FIGS. 4A-D.

442 configured to secure each end of cable 140. In embodiments, holes 444 and 446 (see FIGS. 4C and 5A) receive transversely received cotter pins (not shown) which prevent the cable from escaping the grooves. Thus, each end of the cable is secured within the grooves 440 and 442 in the far side of each sector fan-shaped portion (e.g., portions 432 and 434).

At the servo 136, the cable 140 is spooled about a capstan 448 (see FIG. 4C) to complete continuity of the cable circuit. The capstan 448 is configured to be driven by the servo 136 in a known manner. The controller 112 (see FIG. 1) is configured to cause capstan 448 to rotate to different angular extents to create angular movement of the sector 412 based on automatic throttle instructions received from the FADEC. This enables the lever 104 to be operated according to autopilot commands without any manual assistance being required by the pilot.

Figure 5B:
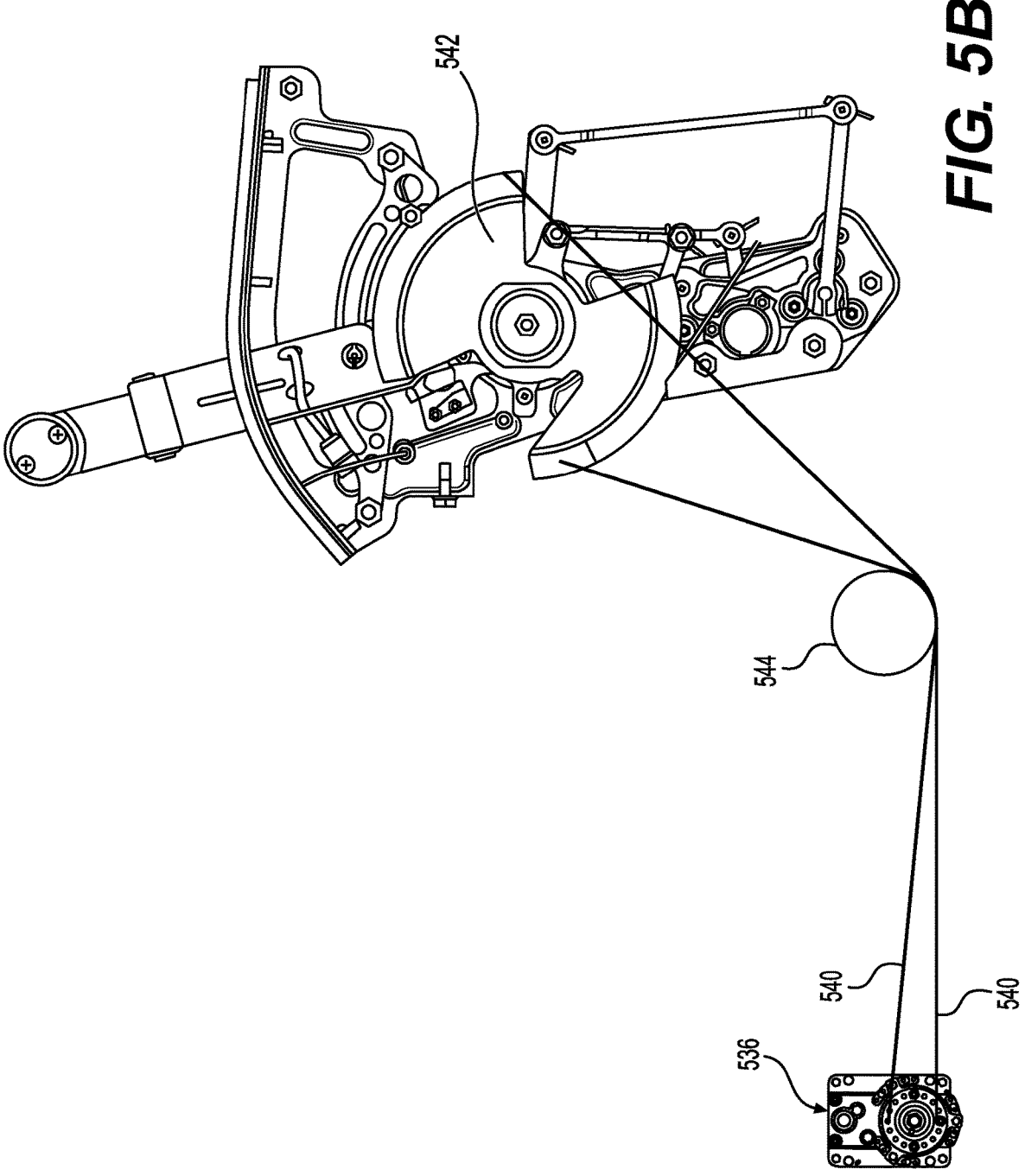
FIG. 5B is a side view of an alternative embodiment like those shown in FIGS. 4A-D except that the servo utilized is able to be located at a more remote location due to the incorporation of a pulley.

FIG. 5B illustrates that in embodiments the servo can be remotely located. E.g., the figure shows a servo 536 being mechanically linked to a sector 542 in much that same manner as is revealed in FIG. 5A, except that the cable 540 used is elongated greatly and run around a pulley 544. Pully 544 might, in embodiments, present two distinct outer annular grooves (not shown) which receive the cable 542 onto the rolling exterior surfaces of the pulley and keep the cable portions from interfering with one another. It is also proposed that even embodiments having multiple pully or other mechanical arrangements could be used to snake the cables around various aircraft structures without compromising the ability for the servo 536 to change the angular positions of the sector 542.

Many different arrangements of the various components depicted, as well as components not shown, are possible without departing from the spirit and scope of what is claimed herein. Embodiments have been described with the intent to be illustrative rather than restrictive. Alternative embodiments will become apparent to those skilled in the art that do not depart from what is disclosed. A skilled artisan may develop alternative means of implementing the aforementioned improvements without departing from what is claimed.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A throttle system for an aircraft, the throttle system comprising:
   a servo configured to rotate a servo output mechanism in response to autopilot commands received from a controller;
   a throttle lever configured to rotate around a stationary hub, the throttle lever comprising:
   an autopilot activation button electrically connected to the controller; and
   an autopilot deactivation button electrically connected to the controller;
   a mechanical connection made between the servo output mechanism and the throttle lever, the mechanical connection being configured to move in response to a rotation of the servo output mechanism in an autopilot mode during an operation; and
   a breakable link included in the mechanical connection and configured to disconnect the throttle lever from the servo output mechanism;

wherein the throttle system is configured to activate the autopilot mode when the throttle lever's autopilot activation button is pressed;

wherein the throttle system is configured to deactivate the autopilot mode whenever a user either presses the throttle lever's autopilot deactivation button or manually rotates the throttle lever;

wherein the breakable link is configured to break whenever a predetermined force, which breaks the breakable link, is applied to the throttle lever during a failure mode which is preventing the user from manually rotating the throttle lever to deactivate the autopilot mode; and wherein manually rotating the throttle lever to deactivate the autopilot mode does not cause the breakable link to break unless the throttle lever is prevented from rotating by the failure mode.

2. The throttle system of claim 1 wherein the mechanical connection is a remote connection.

3. The throttle system of claim 2 wherein the remote connection is established using a cable.

4. The system of claim 3 wherein the cable is secured around both the servo output mechanism and an irregularly-shaped disk which rotates with the throttle lever around the hub.

5. The system of claim 4 wherein the cable is secured into grooved rim on opposed sections established around the irregularly-shaped disk.

6. The system of claim 3 wherein the servo output mechanism is a capstan.

7. The system of claim 1 wherein the throttle lever is a single lever configured to control both propeller speed and pitch.

8. The system of claim 1 wherein the mechanical connection includes a following disk which is fixed to and rotates about the hub along with the throttle lever, the following disk being configured to receive rotation imparted by the servo output mechanism.

9. The system of claim 8 wherein the following disk rotates in spaced-apart parallel plane on the hub relative to the throttle lever.

10. The system of claim 8 wherein the following disk is connected to an outer sector having two opposing fanned out areas, each fanned out area including a grooved outer rim, each grooved outer rim securing an end of a cable received and driven by the servo.

11. The system of claim 8 wherein the following disk has one or more notched-out areas which are defined into a thickness on one side of the following disk directly opposite each of two attachment portions configured in an irregularly-shaped disk, the notched out areas each receiving a fastener and allowing for protruding fastener components to avoid interference with the rotation imparted by the servo output mechanism.

12. The system of claim 8 further comprising:

a cable connection made between the servo output mechanism and a cable-receiving disk, the cable connection imparting the rotation from the servo into the cable-receiving disk; and wherein the following disk rotates with and alongside the cable-receiving disk about the hub during the operation;

wherein the following disk and the cable-receiving disk rotate in distinct parallel planes on the hub;

wherein the breakable link comprises one or more frangible fasteners connecting the following disk to the cable-receiving disk during the operation; and wherein the throttle system is configured to shear the one or more frangible fasteners during a jammed mode of operation, which disconnects the following disk from the cable-receiving disk and enables independent rotation of the following disk relative to the cable-receiving disk.

13. The system of claim 12 wherein the one or more frangible fasteners are disposed on the hub between the distinct parallel planes in which the following disk and the cable-receiving disk rotate.

14. The system of claim 13, wherein the one or more frangible fasteners comprise two rivets which, when sheared, allow for free rotation of the following disk relative to the cable receiving disk on the hub.

15. The system of claim 1 wherein the breakable link comprises at least one connecting device constructed to fail upon the throttle lever receiving the predetermined force greater than an amount of force that is normally required to move the throttle lever and less than an amount of force which would cause damage to the system.

16. The system of claim 1 wherein the breakable link is a connecting mechanism that is configured to be subjected to a shearing force upon an occurrence of a dysfunction in a component in the mechanical connection made between the servo output mechanism and the throttle lever, the shearing force breaking the breakable link.

17. The system of claim 1 wherein the breakable link includes one or more rivets configured to maintain the mechanical connection during the operation, the rivets being further configured to break by shearing upon a jamming of one of the servo or a component of the mechanical connection.

18. An aircraft system comprising:

a controller configured to operate a servo to create angular movement of a control lever during an autopilot mode, the control lever comprising:

an autopilot activation button electrically connected to the controller; and an autopilot deactivation button electrically connected to the controller;

a mechanical connection made between the servo and the control lever, the mechanical connection comprising a follower member which rotates with the control lever and on a common axis with the control lever, the follower member receiving rotation from the servo and consequentially imparting rotation into the control lever; and a breakable link included in the mechanical connection and configured to disconnect the control lever from the servo;

wherein the aircraft system is configured to activate the autopilot mode when the control lever's autopilot activation button is pressed;

wherein the aircraft system is configured to deactivate the autopilot mode whenever a user either presses the control lever's autopilot deactivation button or manually adjusts the control lever; and wherein the breakable link is configured to break whenever a predetermined force, which breaks the breakable link, is applied to the control lever during a failure mode which is preventing the user from manually adjusting the control lever to deactivate the autopilot mode; and wherein manually adjusting the control lever to deactivate the autopilot mode does not cause the breakable link to break unless the control lever is prevented from rotating by the failure mode.

19. The system of claim 18 wherein:

the follower member rotates in spaced-apart parallel plane on a hub relative to the control lever; and a sector rotates in an additional parallel plane outside of the follower member, the sector including a grooved outer rim, the grooved outer rim securing two ends of a cable that is driven by the servo.

20. The system of claim 19 wherein the cable is configured to run around a double-grooved pulley, a first groove on the double-grooved pulley receiving a first portion of the cable running from an upper portion of the sector, and a second groove on the double-grooved pulley receiving a second portion of the cable running from a lower portion of the sector, the double-grooved pulley configured to cause the cable to avoid an existing aircraft structure without compromising functionality of the servo in rotating the sector.

21. The system of claim 18, wherein:

the breakable link comprises a pair of rivets linking a sector to the follower member; and shearing of the rivets severs the mechanical connection between the servo and the control lever, such that the control lever continues operation manually.

\* \* \* \* \*